United States Patent
Asano et al.

(10) Patent No.: US 10,395,838 B2
(45) Date of Patent: Aug. 27, 2019

(54) MULTILAYER CERAMIC ELECTRONIC COMPONENT INCLUDING AN ORGANIC LAYER

(71) Applicant: Murata Manufacturing Co., Ltd., Nagaokakyo-shi, Kyotu-fu (JP)

(72) Inventors: Hiroshi Asano, Nagaokakyo (JP); Nobuyasu Hamamori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 102 days.

(21) Appl. No.: 15/708,464

(22) Filed: Sep. 19, 2017

(65) Prior Publication Data
US 2018/0082786 A1    Mar. 22, 2018

(30) Foreign Application Priority Data
Sep. 20, 2016    (JP) .................. 2016-183324

(51) Int. Cl.
*H01G 4/30*    (2006.01)
*H01G 4/232*   (2006.01)
*H01G 4/12*    (2006.01)

(52) U.S. Cl.
CPC .............. *H01G 4/30* (2013.01); *H01G 4/232* (2013.01); *H01G 4/2325* (2013.01); *H01G 4/12* (2013.01)

(58) Field of Classification Search
CPC ........ H01G 4/2325; H01G 4/232; H01G 4/14; H01G 4/12; H01G 4/30; H01G 4/005
See application file for complete search history.

(56) References Cited

U.S. PATENT DOCUMENTS

| | | | |
|---|---|---|---|
| 8,149,566 B2* | 4/2012 | Motoki ................. | H01G 4/232 361/305 |
| 2010/0302704 A1* | 12/2010 | Ogawa ................ | H01G 4/2325 361/306.3 |
| 2016/0172110 A1* | 6/2016 | Otani .................... | H01G 4/30 361/301.4 |
| 2018/0082785 A1* | 3/2018 | Asano .................... | H01G 4/005 |
| 2018/0082787 A1* | 3/2018 | Hamamori ............ | H01G 4/005 |
| 2018/0082788 A1* | 3/2018 | Asano .................... | H01G 4/005 |
| 2018/0082789 A1* | 3/2018 | Asano .................... | H01G 2/10 |

FOREIGN PATENT DOCUMENTS

| | | | |
|---|---|---|---|
| JP | 2010027730 A | * | 2/2010 |
| JP | 2010-109238 A | | 5/2010 |

OTHER PUBLICATIONS

Asano et al., "Multilayer Ceramic Electronic Component," U.S. Appl. No. 15/708,462, filed Sep. 19, 2017.
(Continued)

*Primary Examiner* — David M Sinclair
(74) *Attorney, Agent, or Firm* — Keating & Bennett, LLP

(57) ABSTRACT

In a multilayer ceramic capacitor, A>B is satisfied by an atomic concentration ratio B of Si to Cu in a first organic layer disposed on a first base electrode layer located on a first end surface, an atomic concentration ratio A of Si to Cu in the first organic layer disposed on the first base electrode layer located on a first principal surface and a second principal surface, and an atomic concentration ratio A of Si to Cu in the first organic layer located directly on the first principal surface and the second principal surface.

17 Claims, 3 Drawing Sheets

(56) References Cited

OTHER PUBLICATIONS

Hamamori et al., "Multilayer Ceramic Electronic Component," U.S. Appl. No. 15/708,469, filed Sep. 19, 2017.
Asano et al., "Multilayer Ceramic Electronic Component," U.S. Appl. No. 15/708,474, filed Sep. 19, 2017.
Asano et al., "Multilayer Ceramic Electronic Component and Manufacturing Method Therefor," U.S. Appl. No. 15/708,476, filed Sep. 19, 2017.

* cited by examiner

//www.freepatentsonline.com/

MULTILAYER CERAMIC ELECTRONIC COMPONENT INCLUDING AN ORGANIC LAYER

CROSS REFERENCE TO RELATED APPLICATIONS

This application claims the benefit of priority to Japanese Patent Application No. 2016-183324 filed on Sep. 20, 2016. The entire contents of this application are hereby incorporated herein by reference.

BACKGROUND OF THE INVENTION

1. Field of the Invention

The present invention relates to a multilayer ceramic electronic component, such as a capacitor, an inductor, and a resistor.

2. Description of the Related Art

Conventionally, multilayer ceramic electronic components, such as capacitors, inductors, and resistors, have been used for various electronic devices.

In general, these electronic components each include two principal surfaces opposite in the laminating direction, two side surfaces opposite in the width direction perpendicular to the laminating direction, and two end surfaces opposite in the length direction perpendicular to the laminating direction and the width direction.

Two or more external electrodes are provided on the outer surface of the laminated body. The external electrodes are each provided on the end surfaces and portions of the principal surfaces, the end surfaces and portions of the side surfaces, or the end surfaces and portions of the side surfaces and principal surfaces. The external electrodes have a substantially U-shaped or substantially L-shaped cross section in the laminating direction.

Such a multilayer ceramic electronic component is mounted on a substrate by electrically connecting portions of the respective external electrodes, provided primarily on the principal surfaces or the side surfaces, to lands of a substrate with a joint material, such as a solder interposed therebetween.

However, when the substrate of the mounted structure is warped by a thermal shock or the like, a stress resulting from the warp propagates, through the lands, the joint material, and the external electrodes, to the laminated body, so as to cause the ceramic portion and the internal electrode portion of the laminated body to crack, deform, or the like. As a result, this will cause a decrease in performance and/or a decrease in reliability in the multilayer ceramic electronic component.

Therefore, Japanese Patent Application Laid-Open No. 2010-109238 discloses wraparound portions of external terminal electrodes respectively provided with leading-end spaced portions spaced from principal surfaces of a ceramic body, in order to prevent the ceramic body from cracked by the stress mentioned previously.

However, the wraparound portions of the external terminal electrodes in Japanese Patent Application Laid-Open No. 2010-109238 respectively include base end-side joint portions joined to the principal surfaces of the ceramic body. Accordingly, there is concern that the stress will propagate to the ceramic body through the base end-side joint portions and the external terminal electrodes, and it has been difficult to adequately reduce or prevent cracks.

SUMMARY OF THE INVENTION

Preferred embodiments of the present invention provide multilayer ceramic electronic components which are able to, when a substrate is warped by a thermal shock or other force with the component mounted on the substrate, reduce or prevent the propagation of a stress caused by the warp to a laminated body, thus preventing cracks.

A multilayer ceramic electronic component according to a preferred embodiment of the present invention includes a laminated body including a plurality of dielectric layers that are laminated and a plurality of internal electrodes that are laminated, and including a first principal surface and a second principal surface that are opposed to each other in a laminating direction, a first side surface and a second side surface opposed to each other in a width direction perpendicular or substantially perpendicular to the laminating direction, and a first end surface and a second end surface that are opposed to each other in a length direction perpendicular or substantially perpendicular to the laminating direction and the width direction, a first external electrode connected to the internal electrodes, and disposed on the first end surface, with an end extending on the first principal surface, the second principal surface, the first side surface, and the second side surface; and a second external electrode connected to the internal electrodes, and disposed on the second end surface, with an end extending on the first principal surface, the second principal surface, the first side surface, and the second side surface, wherein the first external electrode includes a first base electrode layer including a conductive metal and a glass component, a first organic layer including an organic silicon compound, disposed to cover the first base electrode layer, and a first plating layer disposed on the first organic layer, the second external electrode includes a second base electrode layer including a conductive metal and a glass component, a second organic layer including an organic silicon compound, disposed to cover the second base electrode layer, and a second plating layer disposed on the second organic layer, the first organic layer disposed to cover from the first base electrode layer to the surface of the laminated body, and the second organic layer disposed to cover from the second base electrode layer to the surface of the laminated body, a leading end of the first plating layer is in contact with the first organic layer, and a leading end of the second plating layer is in contact with the second organic layer, and a relational expression of A>B is satisfied by an atomic concentration ratio B of Si to Cu in the first organic layer disposed on the first base electrode layer located on the first end surface, an atomic concentration ratio A of Si to Cu in the first organic layer disposed on the first base electrode layer located on the first principal surface and the second principal surface, and an atomic concentration ratio A of Si to Cu in the first organic layer located directly on the first principal surface and the second principal surface, and a relational expression of A>B is satisfied by an atomic concentration ratio B of Si to Cu in the second organic layer disposed on the second base electrode layer located on the second end surface, an atomic concentration ratio A of Si to Cu in the second organic layer disposed on the second base electrode layer located on the first principal surface and the second principal surface, and an atomic concentration ratio A of Si to Cu in the second organic layer located directly on the first principal surface and the second principal surface.

In addition, in a multilayer ceramic electronic component according to a preferred embodiment of the present invention, preferably, the adhesion strength between the laminated body and the first base electrode layer is higher than the adhesion strength between the first organic layer and the first plating layer, and the adhesion strength between the laminated body and the second base electrode layer is higher than the adhesion strength between the second organic layer and the second plating layer.

Furthermore, in a multilayer ceramic electronic component according to a preferred embodiment of the present invention, preferably, the adhesion strength between the laminated body and the first organic layer is higher than the adhesion strength between the first organic layer and the first plating layer, and the adhesion strength between the laminated body and the second organic layer is higher than the adhesion strength between the second organic layer and the second plating layer.

In addition, in a multilayer ceramic electronic component according to a preferred embodiment of the present invention, the first organic layer and the second organic layer each preferably include an organic silicon compound that has a structure of multifunctional alkoxysilane $Si-(C_nH_{2n+1})_3$, and contains an N element.

Furthermore, in a multilayer ceramic electronic component according to a preferred embodiment of the present invention, preferably, an atomic concentration ratio of Si to Cu is about 1% or more and about 5% or less between a Cu concentration and an Si concentration at the surface of the first organic layer, and an atomic concentration ratio of Si to Cu is about 1% or more and about 5% or less between a Cu concentration and an Si concentration at the surface of the second organic layer.

In addition, a multilayer ceramic electronic component according to a preferred embodiment of the present invention is preferably a multilayer ceramic capacitor.

In accordance with a multilayer ceramic electronic component according to a preferred embodiment of the present invention, preferably, a relational expression of A>B is met by the atomic concentration ratio B of Si to Cu in the first organic layer disposed on the first base electrode layer located on the first end surface, the atomic concentration ratio A of Si to Cu in the first organic layer disposed on the first base electrode layer located on the first principal surface and the second principal surface, and the atomic concentration ratio A of Si to Cu in the first organic layer located directly on the first principal surface and the second principal surface, and the relational expression of A>B is satisfied by the atomic concentration ratio B of Si to Cu in the second organic layer disposed on the second base electrode layer located on the second end surface, the atomic concentration ratio A of Si to Cu in the second organic layer disposed on the second base electrode layer located on the first principal surface and the second principal surface, and the atomic concentration ratio A of Si to Cu in the second organic layer located directly on the first principal surface and the second principal surface, so as to cause the first side surface and the second side surface to stop delamination of the first organic layer and the second organic layer, and thus making it possible to avoid a decreased reliability.

In addition, in accordance with a multilayer ceramic electronic component according to a preferred embodiment of the present invention, preferably, the adhesion strength between the laminated body and the first base electrode layer is higher than the adhesion strength between the first organic layer and the first plating layer, and the adhesion strength between the laminated body and the second base electrode layer is higher than the adhesion strength between the second organic layer and the second plating layer, thus further reducing defects, such as regarding the reliability of the multilayer ceramic electronic component.

Furthermore, in accordance with a multilayer ceramic electronic component according to a preferred embodiment of the present invention, the adhesion strength between the laminated body and the first organic layer is higher than the adhesion strength between the first organic layer and the first plating layer, and the adhesion strength between the laminated body and the second organic layer is higher than the adhesion strength between the second organic layer and the second plating layer, thus making it possible to, if a substrate is warped by a thermal shock or other force with the multilayer ceramic electronic component mounted on the substrate, cause a stress due to the warp to achieve delamination between the first base electrode layer and the first plating layer of the first external electrode, and similarly, delamination between the second base electrode layer and the second plating layer of the second external electrode in a further rational manner. Therefore, the stress is further dispersed, thus making it possible to prevent any cracks, deformation, and other defects from being generated in the ceramic portion and the internal electrode portion of the multilayer ceramic electronic component. As a result, the reliability of the multilayer ceramic electronic component is further improved.

Furthermore, in accordance with a multilayer ceramic electronic component according to a preferred embodiment of the present invention, preferably, the first organic layer and the second organic layer include an organic silicon compound that has a structure of multifunctional alkoxysilane $Si-(C_nH_{2n+1})_3$ and includes an N element, so as to reliably provide the layers on the surfaces of the laminated body, the first base electrode layer of the first external electrode, and other suitable structure, thus improving the reliability.

Furthermore, in accordance with a multilayer ceramic electronic component according to a preferred embodiment of the present invention, preferably the atomic concentration ratio of Si to Cu is about 1% or more and about 5% or less between the Cu concentration and the Si concentration at the surface of the first organic layer, with a leading end of the second plating layer in contact with the second organic layer, and the atomic concentration ratio of Si to Cu is about 1% or more and about 5% or less between the Cu concentration and the Si concentration at the surface of the second organic layer, thus making it possible to not only prevent any cracks, deformation, or other defects from being generated in the ceramic portion and the internal electrode portion of the multilayer ceramic electronic component, but also reducing or preventing defective plating and deviations of the multilayer ceramic electronic component.

According to various preferred embodiments of the present invention, cracks, deformations, and other defects, are prevented from being generated in the ceramic portion and the internal electrode portion of the laminated body, thus improving the performance and reliability of the multilayer ceramic electronic component.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic electronic components according to preferred embodiments of the present invention will be described in detail below with reference to the drawings. It is to be noted that multilayer ceramic capacitors will be described as examples of a multilayer ceramic electronic component in the following preferred embodiments. Further, like or corresponding elements and structures are denoted by the symbols in the figures, but the descriptions of the elements and structures will not be repeated.

Figure 1:
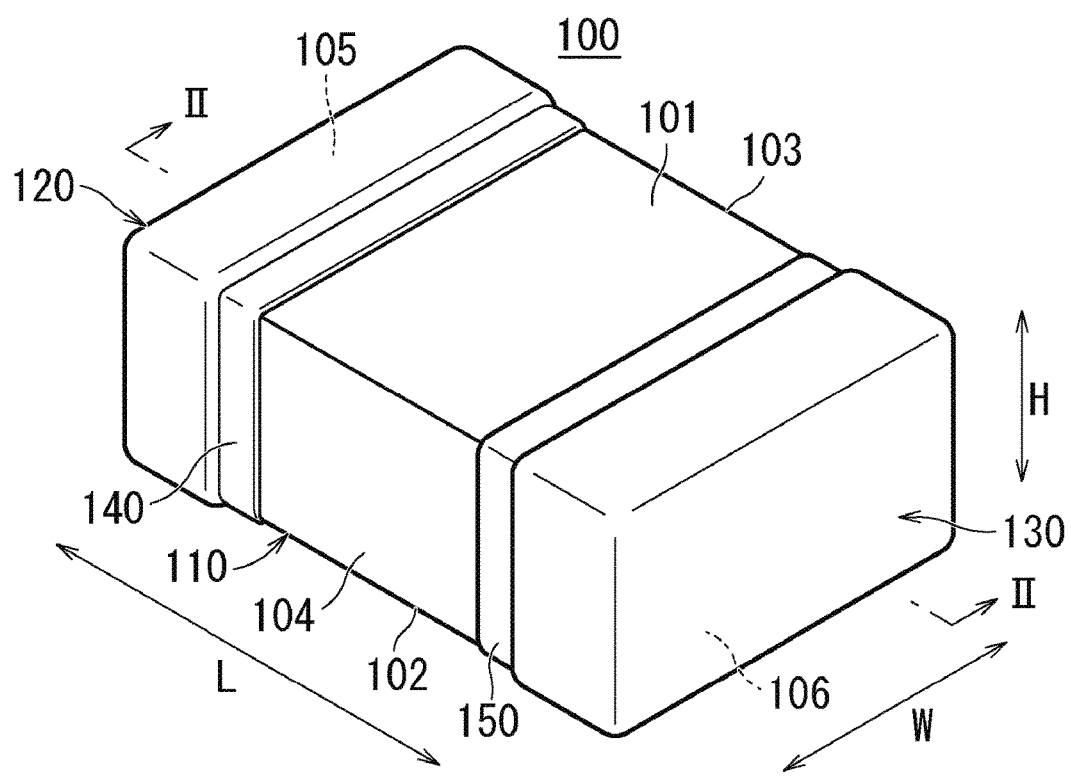
FIG. 1 is a perspective view illustrating a multilayer ceramic electronic component according to a first preferred embodiment of the present invention.
Figure 2:
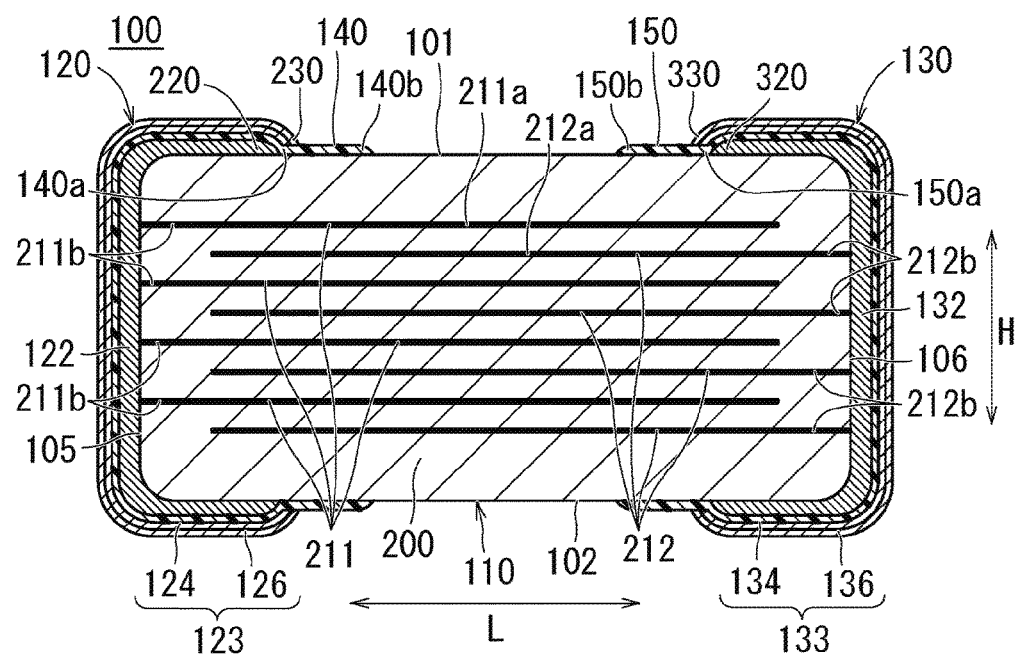
FIG. 2 is a cross-sectional view of the multilayer ceramic electronic component according to the first preferred embodiment of the present invention, as viewed from the direction of an arrow along line II-II in FIG. 1.
Figure 3:
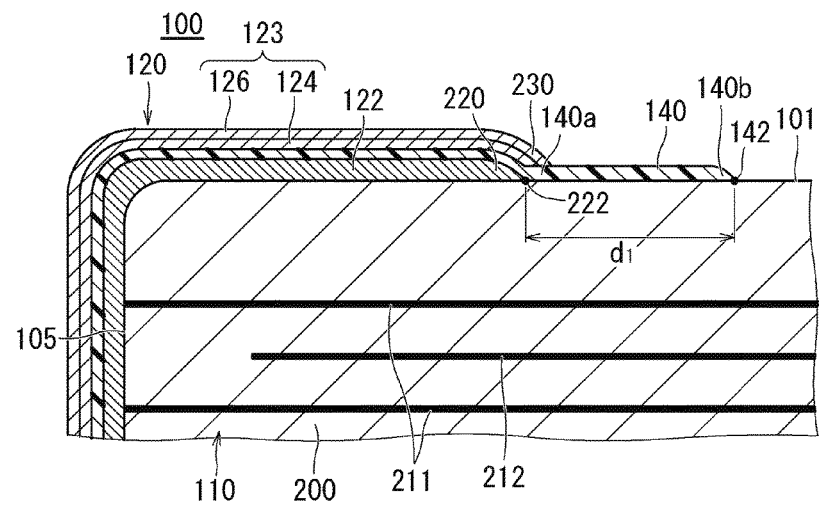
FIG. 3 is a cross-sectional view of the multilayer ceramic electronic component according to the first preferred embodiment of the present invention, which is a partially enlarged view of an external electrode in FIG. 2.

FIG. 1 is a perspective view illustrating a multilayer ceramic capacitor according to a preferred embodiment of the present invention. FIG. 2 is a cross-sectional view of the multilayer ceramic capacitor according to the present preferred embodiment, as viewed from the direction of an arrow along line II-II in FIG. 1. FIG. 3 is a cross-sectional view of the multilayer ceramic electronic component according to the present preferred embodiment, which is a partially enlarged view of an external electrode in FIG. 2.

The multilayer ceramic capacitor 100 according to the present preferred embodiment of the present invention preferably has a cuboid or substantially cuboid shape, where the dimension in a length direction L is larger than the dimension in a width direction W. The cuboid or substantially cuboid shape encompasses a multilayer ceramic capacitor 100, which includes rounded corners and ridges, and the multilayer ceramic capacitor 100, which includes surfaces provided with differences in level or unevenness.

The multilayer ceramic capacitor 100 includes a laminated body 110, a first external electrode 120, and a second external electrode 130.

The laminated body 110 includes a first principal surface 101 and a second principal surface 102 opposed to each other in the laminating direction H of a plurality of dielectric layers, a first side surface 103 and a second side surface 104 opposed to each other in the width direction W perpendicular or substantially perpendicular to the laminating direction H, and a first end surface 105 and a second end surface 106 opposed to each other in the length direction L perpendicular or substantially perpendicular to both the laminating direction H and the width direction W.

The direction of stacking of the dielectric layers of the laminated body 110 is defined as the laminating direction H, the direction of connecting the first external electrode 120 and the second external electrode 130 of the multilayer ceramic capacitor 100, among directions perpendicular or substantially perpendicular to the laminating direction H, is defined as the length direction L of the laminated body 110, and the direction perpendicular or substantially perpendicular to both the laminating direction H and the length direction L is defined as the width direction W of the laminated body 110, and these terms will be used in the following description.

The laminated body 110 includes the plurality of dielectric layers 200 and a plurality of internal electrodes that are alternately laminated. The laminated body 110 preferably has a cuboid or substantially cuboid shape. The laminating direction H of the plurality of dielectric layers 200 and the plurality of internal electrodes corresponds to the height direction.

The laminated body 110 includes a plurality of first internal electrodes 211 and a plurality of second internal electrodes 212 that are alternately arranged in different layers.

The first internal electrodes 211 each includes, as viewed from the laminating direction H, a rectangular or substantially rectangular first opposed portion 211a, and a first extended portion 211b extended from the first opposed portion 211a to the first end surface 105 of the laminated body 110. The first extended portion 211b includes an end surface exposed at the first end surface 105.

The second internal electrodes 212 each includes, as viewed from the laminating direction H, a rectangular or substantially rectangular second opposite portion 212a, and a second extended portion 212b extended from the second opposite portion 212a to the second end surface 106 of the laminated body 110. The second extended portion 212b includes an end surface exposed at the second end surface 106.

As shown in FIG. 2, the first opposed portions 211a of the first internal electrodes 211 and the second opposed portions 212a of the second internal electrodes 212 provide electrostatic capacitance with the dielectric layers 200 interposed therebetween.

The dielectric layers 200 are preferably made of, for example, a dielectric ceramic material containing, as its main constituent, $BaTiO_3$, $CaTiO_3$, $SrTiO_3$, $CaZrO_3$, $PbTiO_3$, $Pb(Zr,Ti)O_3$, or other suitable material. In addition, the dielectric layers 200 may preferably include, as accessory constituents, an Mn compound, an Fe compound, a Cr compound, a Co compound, an Ni compound, or other suitable compounds. The dielectric layers 200 are preferably about 0.5 μm or more and about 10 μm or less in thickness, for example.

The first internal electrodes 211 and the second internal electrodes 212 may preferably be composed of, for example, appropriate conductive materials such as metals, e.g., Ni, Cu, Ag, Pd, or Au, alloys (e.g., Ag—Pd alloys) containing at least one of the metals. The first internal electrodes 211 and the second internal electrodes 212 are each preferably about 0.2 μm or more and about 2.0 μm or less in thickness, for example.

The first external electrode 120 is disposed on the first end surface 105 of the laminated body 110, with ends extending onto the first principal surface 101 and the second principal surface 102 as well as the first side surface 103 and the second side surface 104. The first external electrode 120 is electrically connected to the first internal electrodes 211.

The second external electrode 130 is disposed on the second end surface 106 of the laminated body 110, with ends extending onto the first principal surface 101 and the second principal surface 102 as well as the first side surface 103 and the second side surface 104. The second external electrode 130 is electrically connected to the second internal electrodes 212. The first external electrode 120 and the second external electrode 130 are spaced apart from each other in the length direction L of the laminated body 110.

The first external electrode 120 includes a first base electrode layer 122 including a conductive metal and a glass component, a first organic layer 140 including an organic silicon compound, disposed to cover the first base electrode layer 122, and a first plating layer 123 disposed on the first organic layer 140. Similarly, the second external electrode 130 includes a second base electrode layer 132 including a conductive metal and a glass component, a second organic layer 150 including an organic silicon compound, disposed to cover the second base electrode layer 132, and a second plating layer 133 disposed on the second organic layer 150.

The first base electrode layer 122 is disposed on the first end surface 105 of the laminated body 110, and structured such that ends extend on the first principal surface 101 and the second principal surface 102 as well as the first side surface 103 and the second side surface 104.

The second base electrode layer 132 is disposed on the second end surface 106 of the laminated body 110, and structured such that ends extend on the first principal surface 101 and the second principal surface 102 as well as the first side surface 103 and the second side surface 104.

The first base electrode layer 122 and the second base electrode layer 132 are formed by, for example, applying a conductive paste including a conductive metal and a glass component, and baking the paste. For example, Cu, Ni, Ag, Pd, an Ag-Pd alloy, Au, or other suitable materials may preferably be used as the conductive metal for the first base electrode layer 122 and the second base electrode layer 132. For example, glass containing B, Si, Ba, Mg, Al, Li, or other suitable materials may preferably be used as the glass component for the first base electrode layer 122 and the second base electrode layer 132.

The first base electrode layer 122 and the second base electrode layer 132 may preferably be obtained by co-firing with the internal electrodes, or obtained by applying a conductive paste to the surface of the fired laminated body 110, and baking the paste. The first base electrode layer 122 and the second base electrode layer 132 are each preferably about 10 µm or more and about 50 µm or less in the thickness at the thickest portion, for example.

The first plating layer 123 covers the first organic layer 140 disposed on the first base electrode layer 122. Specifically, the first plating layer 123 is preferably disposed on the first organic layer 140 disposed on the first end surface 105 of the laminated body 110 and extended therefrom to the first organic layer 140 disposed on the first principal surface 101, the second principal surface 102, the first side surface 103, and the second side surface 104 of the laminated body 110.

The second plating layer 133 covers the second organic layer 150 disposed on the second base electrode layer 132. Specifically, the second plating layer 133 is preferably disposed on the second organic layer 150 disposed over the second end surface 106 of the laminated body 110 and extended therefrom to the second organic layer 150 disposed on the first principal surface 101, the second principal surface 102, the first side surface 103, and the second side surface 104 of the laminated body 110.

The first plating layer 123 and the second plating layer 133 are preferably made of, for example, at least one selected from Cu, Ni, Ag, Pd, Ag-Pd alloy, Au, Sn, and other suitable material.

The first plating layer 123 may include multiple layers, and preferably has a two-layer structure of an Ni plating layer 124 and an Sn plating layer 126. The second plating layer 133 may include multiple layers, and preferably has a two-layer structure of an Ni plating layer 134 and an Sn plating layer 136. The plating layer is preferably about 1 µm or more and about 15 µm or less in thickness per layer, for example.

The Ni plating layer 124 of the first plating layer 123 covers the first organic layer 140 that covers the surface of the first base electrode layer 122 of the first external electrode 120. Thus, the first organic layer 140 and the first base electrode layer 122 are prevented from being eroded by a solder during mounting of the multilayer ceramic capacitor 100.

The Ni plating layer 134 of the second plating layer 133 covers the second organic layer 150 that covers the surface of the second base electrode layer 132 of the second external electrode 130. Thus, the second organic layer 150 and the second base electrode layer 132 are prevented from being eroded by a solder during mounting of the multilayer ceramic capacitor 100.

In addition, the Sn plating layer 126 is further provided on the Ni plating layer 124 for the first external electrode 120, so as to improve the solderability of the first external electrode 120. Similarly, the Sn plating layer 136 is provided on the Ni plating layer 134 for the second external electrode 130, so as to improve the solderability of the second external electrode 130. As a result, mounting of the multilayer ceramic capacitor 100 is facilitated.

The first organic layer 140 covers the first base electrode layer 122 and extends therefrom to cover the surface of the laminated body 110. More specifically, the first organic layer 140 covers an end 220 of the first base electrode layer 122. The portion of the first organic layer 140 in contact with the laminated body 110 is located closer to the first end surface 105 of the laminated body 110, and disposed on the first principal surface 101, the second principal surface 102, the first side surface 103, and the second side surface 104 so as to wrap around the surface of the laminated body 110. One end 140a of the portion of the first organic layer 140 in contact with the laminated body 110 makes contact so as to cover the end 220 of the first base electrode layer 122 of the first external electrode 120. The portion of the first organic layer 140 in contact with the laminated body 110 extends from the end 220 of the first base electrode layer 122 to at least a portion of the surface of the laminated body 110, and the other end 140b is located closer to the second end surface 106 than the end 230 of the first plating layer 123 and is exposed. Furthermore, the end 230 of the first plating layer 123 of the first external electrode 120 preferably makes contact with the surface of one end 140a of the portion of the first organic layer 140 in contact with the laminated body 110.

The second organic layer 150 covers the second base electrode layer 132 and extends therefrom, to cover the surface of the laminated body 110. More specifically, the second organic layer 150 covers the end 320 of the second base electrode layer 132. The portion of the second organic layer 150 in contact with the laminated body 110 is located closer to the second end surface 106 of the laminated body 110, and disposed on the first principal surface 101, the second principal surface 102, the first side surface 103, and the second side surface 104 so as to wrap around the surface of the laminated body 110. One end 150a of the portion of the second organic layer 150 in contact with the laminated body 110 makes contact so as to cover the end 320 of the second base electrode layer 132 of the second external electrode 130. The portion of the second organic layer 150 in contact with the laminated body 110 extends from the end 320 of the second base electrode layer 132 to at least a portion of the surface of the laminated body 110, and the other end 150b is located closer to the first end surface 105 than the end 330 of the second plating layer 133 and is exposed. Furthermore, the end 330 of the second plating layer 133 of the second external electrode 130 preferably makes contact with the surface of one end 150a of the portion of the second organic layer 150 in contact with the laminated body 110.

In accordance with the foregoing configuration, if a substrate is warped by a thermal shock or other force with the multilayer ceramic capacitor 100 mounted on the substrate, a stress caused by the warp may cause delamination between the first base electrode layer 122 and the first plating layer 123 of the first external electrode 120 and delamination between the second base electrode layer 132 and the second plating layer 133 of the second external electrode 130. Therefore, the stress is dispersed, thus preventing any cracks, deformation, or defects from being generated in the ceramic portion and the internal electrode portion of the multilayer ceramic capacitor 100. As a result, the reliability of the multilayer ceramic capacitor 100 is improved. In this regard, the cracks are defined as cracking which develops from the outer layer portion toward the internal electrode layer portion with an external electrode end as a starting point.

As shown in FIG. 3, a portion of the first organic layer 140 in contact with the laminated body 110 preferably has a dimension $d_1$ (that is, a dimension in the length direction L from a leading end 222 of the first base electrode layer 122 to a leading end 142 of the first organic layer 140 closer to the second end surface 106) of about 5 μm or more and about 100 μm or less, for example, in the length direction L. It is to be noted that the same applies to the second organic layer 150. Thus, delamination is reliably achieved between the base electrode layers and the plating layers without causing problems, such as defective soldering.

The portion of the first organic layer 140, disposed on the laminated body 110, preferably has a larger thickness than the portion of the first organic layer 140 disposed on the first base electrode layer 122. Thus, delamination is reliably achieved between the first base electrode layer 122 and the first plating layer 123. Similarly, the portion of the second organic layer 150, disposed on the laminated body 110, preferably has a larger thickness than the portion of the second organic layer 150 disposed on the second base electrode layer 132. Thus, delamination is reliably achieved between the second base electrode layer 132 and the second plating layer 133. The portions of the first organic layer 140 and the second organic layer 150, disposed on the first principal surface 101 and the second principal surface 102 of the laminated body 110, are preferably about 5 nm or more and about 100 nm or less, for example, in thickness. In addition, the first organic layer 140 on the end 220 of the first base electrode layer 122 (the portion in the location of the leading end) and the first organic layer 150 on the end 320 of the second base electrode layer 132 (the portion in the location of the leading end) are preferably each about 5 nm or more and about 500 nm or less, for example, in thickness. Thus, the laminated body 110 is not only effectively prevented from being cracked, but also defective plating as well as deviations of the multilayer ceramic capacitor 100 are reduced or prevented.

The first organic layer 140 and the second organic layer 150 include an organic silicon compound. For example, decyltrimethoxysilane, n-propyltrimethoxysilane, octyltriethoxysilane, or other suitable organic compound may be used as the organic silicon compound. In particular, an organic silicon compound that has a structure of multifunctional alkoxysilane $Si—(C_nH_{2n+1})_3$ and contains an N element is preferably used as the first organic layer 140 and the second organic layer 150.

In addition, there is a portion without any organic layer between the first external electrode 120 and the second external electrode 130 of the multilayer ceramic capacitor 100. Thus, a decreased reliability which may be caused by the formation of the organic layers on the surface of the laminated body 110 is prevented.

In addition, the adhesion strength between the first base electrode layer 122 of the first external electrode 120 and the laminated body 110 is preferably higher than the adhesion strength between the first organic layer 140 and the first plating layer 123 of the first external electrode 120. Similarly, the adhesion strength between the second base electrode layer 132 of the second external electrode 130 and the laminated body 110 is preferably higher than the adhesion strength between the second organic layer 150 and the second plating layer 133 of the second external electrode 130.

In addition, the adhesion strength between the laminated body 110 and the first organic layer 140 is preferably higher than the adhesion strength between the first organic layer 140 and the first plating layer 123. Similarly, the adhesion strength between the laminated body 110 and the second organic layer 150 is preferably higher than the adhesion strength between the second organic layer 150 and the second plating layer 133.

In addition, the atomic concentration ratios of Si to Cu are preferably about 1% or more and about 5% or less, for example, at the surfaces of the first organic layer 140 and the second organic layer 150.

In addition, the relational expression of A>B is preferably satisfied when the atomic concentration ratio of Si to Cu is denoted by B in the first organic layer 140 disposed on the first base electrode layer 122 located on the first end surface 105, the atomic concentration ratio of Si to Cu is denoted by A in the first organic layer 140 disposed on the first base electrode layer 122 located on the first principal surface 101 and the second principal surface 102, and the atomic concentration ratio of Si to Cu is also denoted by A in the first organic layer 140 located directly on the first principal surface 101 and the second principal surface 102. Similarly, the relational expression of A>B is preferably satisfied when the atomic concentration ratio of Si to Cu is denoted by B in the second organic layer 150 disposed on the second base electrode layer 132 located on the second end surface 106, the atomic concentration ratio of Si to Cu is denoted by A in the second organic layer 150 disposed on the second base electrode layer 132 located on the first principal surface 101 and the second principal surface 102, and the atomic concentration ratio of Si to Cu is also denoted by A in the second organic layer 150 located directly on the first principal surface 101 and the second principal surface 102.

Thus, delamination of the first organic layer 140 and the second organic layer 150 is stopped by the first side surface 103 and the second side surface 104, thus preventing decreased reliability.

Further, the atomic concentration ratio of Si to Cu in the first organic layer 140 disposed on the first base electrode layer 122 located on the first side surface 103 and the second side surface 104 and the atomic concentration ratio of Si to Cu in the first organic layer 140 located directly on the first side surface 103 and the second side surface 104 preferably have the same value as A, and preferably satisfy the relational expression of A>B.

The atomic concentration ratios described above are measured by XPS (X-ray photoelectron spectroscopy). More specifically, the atomic concentration ratios may be obtained by making a cut that is about 150 μm square at central portions of the chip side surface and the end surface, peeling the first plating layer 123 or the second plating layer 133 at the cut portions, applying an XPS (X-ray photoelectron spectroscopy) analysis to the surfaces, and calculating the atomic concentration ratios based on the respective peak areas of Cu2p and Si2p and the sensitivity coefficient of the measurement system. In addition, here are detailed measurement conditions for the XPS.

System Name: VersaProbe from ULVAC-PHI
X-Ray: monochromatic Al—Kα Ray
X-Ray Diameter: 100 µm in Half-Power Beamwidth
Takeoff Angle of Photoelectron: 45°
Measured Spectra: Si2p, Cu2p
Compensation Method for Charging during Measurement: Irradiation with Electron Beams and Ion beams In the multilayer ceramic capacitor 100 according to a preferred embodiment of the present invention, the relational expression of A>B is satisfied by the atomic concentration ratio B of Si to Cu in the first organic layer 140 disposed on the first base electrode layer 122 located on the first end surface 105, the atomic concentration ratio A of Si to Cu in the first organic layer 140 disposed on the first base electrode layer 122 located on the first principal surface 101 and the second principal surface 102, and the atomic concentration ratio A of Si to Cu in the first organic layer 140 located directly on the first principal surface 101 and the second principal surface 102, and the relational expression of A>B is satisfied by the atomic concentration ratio B of Si to Cu in the second organic layer 150 disposed on the second base electrode layer 132 located on the second end surface 106, the atomic concentration ratio A of Si to Cu in the second organic layer 150 disposed on the second base electrode layer 132 located on the first principal surface 101 and the second principal surface 102, and the atomic concentration ratio A of Si to Cu in the second organic layer 150 located directly on the first principal surface 101 and the second principal surface 102. Thus, delamination of the first organic layer 140 and the second organic layer 150 is stopped by the first side surface 103 and the second side surface 104, thus preventing decreased reliability.

In addition, in the multilayer ceramic capacitor 100 according to the present preferred embodiment of the present invention, the adhesion strength between the first base electrode layer 122 of the first external electrode 120 and the laminated body 110 is preferably higher than the adhesion strength between the first organic layer 140 and the first plating layer 123 of the first external electrode 120. Similarly, the adhesion strength between the second base electrode layer 132 of the second external electrode 130 and the laminated body 110 is preferably higher than the adhesion strength between the second organic layer 150 and the second plating layer 133 of the second external electrode 130. Thus, delamination is respectively achieved between the first organic layer 140 and the second organic layer 150 and the first plating layer 123 and the second plating layer 133, whereas the adhesion is maintained between the laminated body and the first organic layer 140 and the second organic layer 150, and ingress of water and other contaminates is reliably reduced or prevented. Therefore, defects are further reduced, such as regarding the reliability of the multilayer ceramic capacitor 100.

Furthermore, in the multilayer ceramic capacitor 100 according to the present preferred embodiment, the adhesion strength between the laminated body 110 and the first organic layer 140 is preferably higher than the adhesion strength between the first organic layer 140 and the first plating layer 123. Similarly, the adhesion strength between the laminated body 110 and the second organic layer 150 is preferably higher than the adhesion strength between the second organic layer 150 and the second plating layer 133. Thus, if a substrate is warped by a thermal shock or other forces with the multilayer ceramic capacitor 100 mounted on the substrate, a stress caused by the warp may cause delamination between the first base electrode layer 122 and the first plating layer 123 of the first external electrode 120, and similarly, delamination between the second base electrode layer 132 and the second plating layer 133 of the second external electrode 130 in a further rational manner. Therefore, the stress is further dispersed, thus preventing cracks, deformations, and defects from being generated in the ceramic portion and the internal electrode portion of the multilayer ceramic capacitor 100. As a result, the reliability of the multilayer ceramic capacitor 100 is further improved.

In addition, in the multilayer ceramic capacitor 100 according to the present preferred embodiment, an organic silicon compound that has a structure of multifunctional alkoxysilane Si—$(C_nH_{2n+1})_3$ and contains an N element is preferably used as the first organic layer 140 and the second organic layer 150. Thus, since the layers are reliably formed on the surfaces of the laminated body 110, the first base electrode layer 122 of the first external electrode 120, and other structures, the first organic layer 140 and the second organic layer 150 effectively prevent the laminated body 110 from being cracked, thus improving the reliability.

Furthermore, in the multilayer ceramic capacitor 100 according to the present preferred embodiment, the atomic concentration ratio of Si to Cu is preferably about 1% or more and about 5% or less, for example, at the surfaces of the first organic layer 140 and the second organic layer 150, thus not only preventing the generation of cracks, deformation, and other defects from being generated in the ceramic portion and the internal electrode portion, but also reducing or preventing defective plating as well as deviations of the multilayer ceramic capacitor 100.

Next, a non-limiting example of a method for manufacturing the multilayer ceramic capacitor 100 according to a preferred embodiment of the present invention will be described.

First, the laminated body 110 is prepared which includes the first internal electrodes 211 and the second internal electrodes 212. Specifically, a ceramic paste including a ceramic powder is applied in the form of a sheet, for example, by a screen printing method, and dried, so as to prepare mother ceramic green sheets.

Next, onto the mother ceramic green sheets, a conductive paste for internal electrode formation is applied in a predetermined pattern, for example, by screen printing or other suitable method, thus forming conductive patterns for the formation of internal electrodes as the first internal electrodes 211. Similarly, onto others of the mother ceramic green sheets, a conductive paste for internal electrode formation is applied in a predetermined pattern, for example, by screen printing or other suitable method, thus forming conductive patterns for the formation of internal electrodes as the second internal electrodes 212.

In this manner, the mother ceramic green sheets including the conductive patterns for the formation of internal electrodes as the first internal electrodes 211, the mother ceramic green sheets including the conductive patterns for the formation of internal electrodes as the second internal electrodes 212, and the mother ceramic green sheets without any conductive pattern for the formation of internal electrodes are formed. It is to be noted that the ceramic paste and the conductive paste for internal electrode formation may include, for example, known binders and solvents.

Next, a mother stacked body is prepared. The mother stacked body is prepared as follows. The mother ceramic green sheets for outer layers without any conductive pattern printing for the formation of internal electrodes are stacked to include a predetermined number of sheets, and the mother ceramic green sheets with the conductive pattern printing for the formation of internal electrodes as the first internal electrodes 211 and the mother ceramic green sheets with the conductive pattern printing for the formation of internal electrodes as the second internal electrodes 212 are sequentially stacked thereon in an alternating manner. The mother ceramic green sheets for outer layers without any conductive pattern printing for the formation of internal electrodes are further stacked thereon to include a predetermined number of sheets, thus providing the mother stacked body. The mother stacked body may be, if necessary, subjected to pressing in the stacking direction by an isostatic press or other suitable device.

Next, the mother stacked body is cut in predetermined positions so as to cut out a plurality of raw laminated bodies 110 of a predetermined size. In this regard, the raw laminated bodies 110 may include corners and ridges rounded by barrel polishing or the like.

Next, the raw laminated bodies 110 are subjected to firing, to form laminated bodies 110 provided therein with first internal electrodes 211 and second internal electrodes 212, where the first internal electrodes 211 include first extended portions 211b exposed at first end surfaces 105, the second internal electrodes 212 include second extended portions 212b exposed at second end surfaces 106. The firing temperature is appropriately set depending on the types of the ceramic material and the conductive material, and for example, preferably set within the range of about 900° C. or higher and about 1300° C. or lower.

Next, base electrode layers for external electrodes are formed on both ends of the fired laminated body 110. A conductive paste for external electrodes is applied to the both ends of the fired laminated body 110, and subjected to baking to form the first base electrode layer 122 for the first external electrode 120 and the second base electrode layer 132 for the second external electrode 130. The baking temperature is preferably about 700° C. or higher and about 900° C. or lower, for example.

Next, the first organic layer 140 and the second organic layer 150 are formed. The first organic layer 140 and the second organic layer 150 are prepared as follows.

The first organic layer 140 and the second organic layer 150 are formed by the application of or immersion in an organic process liquid so as to cover predetermined surfaces of the first base electrode layer 122 for the first external electrode 120, of the second base electrode layer 132 for the second external electrode 130, and of the laminated body 110. In the step of forming the first organic layer 140 and the second organic layer 150, the organic process liquid is applied in two batches.

Specifically, the laminated bodies 110 with the baked first base electrode layers 122 and the second base electrode layers 132 respectively for the first external electrodes 120 and the second external electrodes 130 are arranged in the longitudinal direction, and the surfaces of the first external electrodes 120 and the second external electrodes 130 are immersed in the first organic process liquid so as to leave the ends 220 covered by the first organic layers 140 and the ends 320 covered by the second organic layers 150. Thereafter, the laminated body 110 is dried at a temperature of about 100° C. or higher and about 200° C. or lower, for example, to form the portion of the first organic layer 140 covering the first base electrode layer 122 and the portion of the second organic layer 150 covering the second base electrode layer 132 respectively on the surfaces of the first external electrode 120 and the second external electrode 130 so as to leave the end 220 covered by the first organic layer 140 and the end 320 covered by the second organic layer 150. The first organic process liquid is preferably composed of a monofunctional silane coupling material, specifically with the use of decyltrimethoxysilane, n-propyltrimethoxysilane, octyltriethoxysilane, or other suitable material, and obtained by diluting the organic process liquid with an alcohol solvent to about 3 weight % or less, for example.

Next, for the laminated body 110, predetermined surfaces of the first base electrode layer 122 for the first external electrode 120, of the second base electrode layer 132 for the second external electrode 130, and of the laminated body 110 are immersed in the second organic process liquid. The organic film formed from the second organic process liquid is less likely to be formed on the organic film formed from the first organic process liquid, and thus formed on the predetermined surfaces of the end 220 of the first base electrode layer 122, of the end 320 of the second base electrode layer 132, and of the laminated body 110. Thereafter, the laminated body 110 is dried at a temperature of about 100° C. or higher and about 200° C. or lower, for example, to form the first organic layer 140 and the second organic layer 150 so as to cover the end 220 of the first base electrode layer 122 and the end 320 of the second base electrode layer 132. The second organic process liquid is preferably, with the use of multifunctional alkoxysilane $Si-(C_nH_{2n+1})_3$, obtained by diluting the organic process liquid with an alcohol solvent to about 1 weight % or more and about 10 weight % or less, for example. The first organic process liquid and the second organic process liquid preferably each have an organic silicon compound.

Because the first organic process liquid is different from the second organic process liquid, the first organic layer 140 and the second organic layer 150 are formed from the first liquid on the surfaces of the first base electrode layer 122 and the second base electrode layer 132 so as to leave the end 220 and the end 320. Then, the second liquid is less likely to adhere onto the first organic layer 140 and the second organic layer 150 formed the first time, thus allowing the first organic layer 140 and the second organic layer 150 to be formed so as to increase in thickness. As a result, it becomes possible to form the first organic layer 140 adequately on the end 220 of the first base electrode layer 122 of the first external electrode 120, which is a starting point for a crack, and similarly, it becomes possible to form the second organic layer 150 adequately on the end 320 of the second base electrode layer 132 of the second external electrode 130, which is a starting point for a crack, thus making it possible for the crack preventing effect of preferred embodiments of the present invention to be more significant.

Next, plating layers for external electrodes are formed on both ends of the laminated body 110. The first plating layer 123 for the first external electrode 120 is formed to cover almost all of the surface of the first base electrode layer 122 for the first external electrode 120, and the end surface of the end 230 of the first plating layer 123 is formed to cover the surface of one end 140a of the first organic layer 140. Similarly, the second plating layer 133 for the second external electrode 130 is formed to cover almost all of the surface of the second base electrode layer 132 for the second external electrode 130, and the end surface of the end 330 of the second plating layer 133 is formed to cover the surface of one end 150a of the second organic layer 150.

Next, the first organic layer 140 and the second organic layer 150 may be partially removed, if necessary.

The foregoing method is able to easily manufacture the multilayer ceramic capacitor 100 in which cracks, deformations, and other defects are prevented from being generated in the ceramic portion and the internal electrode portion of the laminated body 110, thus improving the performance and the reliability.

Experimental Example 1 will be described below which was provided by the inventors to confirm the advantageous effects of preferred embodiments of the present invention.

In Experimental Example 1, the multilayer ceramic capacitor 100 was prepared by the manufacturing method according to the preferred embodiment described above, and the multilayer ceramic capacitor was checked for the crack generation rate, the defective plating rate, and the reliability (moisture resistance loading).

Here are the specifications of the multilayer ceramic capacitor 100.

Size: Length L: about 1.0 mm, Width W: about 0.5 mm, Height H: about 0.5 mm
Ceramic Material: $BaTiO_3$
Capacitance: about 10 nF
Rated Voltage: 16 V Here are the specifications of the first external electrode 120 and the second external electrode 130.

Base Electrode Layer: Material including Conductive Metal (Cu) and Glass Component
Thickness of Base Electrode Layer: about 30 μm at Central Portion of End Surface
Organic Layer
Portion formed on Base Electrode Layer located on End Surface: Monofunctional Silane Coupling Film of Decyltrimethoxysilane, Atomic Concentration Ratio of Si to Cu (hereinafter, referred to as an "atomic concentration ratio B") about 0.8%
Portion formed on Base Electrode Layer located on Principal Surface and on Principal Surface of Laminated Body: Multifunctional Alkoxysilane Si—$(C_nH_{2n+1})_3$ of Tris-(Trimethoxysilylpropyl)Isocyanurate, Atomic Concentration Ratio of Si to Cu (hereinafter, referred to as an "atomic concentration ratio A") eight ratios of 0% (no portion formed on the base electrode layer located on the principal surface or on the principal surface of the laminated body), about 0.5%, about 0.8%, about 1%, about 3%, about 5%, about 10%, and about 20%
Plating Layer: Two Layers of Ni Plating layer (about 3 μm)+Sn plating Layer (about 3 μm)

Here is the test method.

The multilayer ceramic capacitor 100 was mounted by applying an LF solder paste of about 150 μm in thickness to a JEITA-land FR4 substrate of about 1.6 mm in thickness, then placing the multilayer ceramic capacitor 100 thereon, and passing the substrate through a reflow furnace at about 240° C. Further, for comparison, multilayer ceramic capacitors were also mounted in the same manner according to each of: Comparative Example 1 (conventional multilayer ceramic capacitor) which does not include the first organic layer 140 and the second organic layer 150; and Comparative Example 2 including organic layers without any portion provided on the base electrode layers located on the principal surfaces or on the principal surfaces of the laminated body. The number of multilayer ceramic capacitors mounted is 100 for every type. The mounted multilayer ceramic capacitors were placed on a hot plate at about 240° C. to melt the LF solder paste, so as to remove the multilayer ceramic capacitor from the substrate. Then, polishing was performed from a direction perpendicular or substantially perpendicular to the mounting surface, thus confirming whether any crack was generated or not.

The atomic concentration ratios of Si to Cu in the first organic layer 140 and the second organic layer 150 were measured by XPS (X-ray photoelectron spectroscopy). More specifically, the atomic concentration ratios were obtained by making a cut on the about 150 μm square at central portions of the chip side surface and the end surface, peeling the first plating layer 123 or the second plating layer 133 at the cut portions, applying an XPS (X-ray photoelectron spectroscopy) analysis to the surfaces, and calculating the atomic concentration ratios on the basis of the respective peak areas of Cu2p and Si2p and the sensitivity coefficient of the measurement system. In addition, here are detailed measurement conditions for the XPS.

System Name: VersaProbe from ULVAC-PHI
X-Ray: monochromatic Al—Kα Ray
X-Ray Diameter: about 100 μm in Half-Power Beamwidth
Takeoff Angle of Photoelectron: about 45°
Measured Spectra: Si2p, Cu2p
Compensation Method for Charging during Measurement: Irradiation with Electron Beams and Ion beams The crack is defined as cracking which develops from the outer layer portion toward the internal electrode layer portion with an external electrode end as a starting point. As for the method for checking the crack, cross-section polishing was performed on a chip central portion (located at about ½ W, for example) from a direction perpendicular or substantially perpendicular to the substrate mounting surface (first or second side surface), and thereafter, the cross section was observed with the use of an SEM (electron microscope) while focusing an external electrode end.

As for the method for checking defective plating, the plated samples were observed with a metallograph (100-fold magnification), and the samples with the base electrode layers visible at an occupancy ratio of about 5% or more were regarded as defective plating.

As for the method for checking the reliability (moisture resistance loading), the multilayer ceramic capacitors 100 were mounted on a JEITA-land FR4 substrate as mentioned above, and then subjected to a moisture resistance loading test. As a test condition, a load of about 16 V was applied under an environment at about 85° C. and about 85% RH, the capacitance was measured after a lapse of about 2000 hours, and variations of about 10% or more were regarded as NG.

Table 1 shows therein the experimental results.

TABLE 1

|  | Comparative Example | | | | Example | | | | |
| --- | --- | --- | --- | --- | --- | --- | --- | --- | --- |
|  | 1 | 2 | 3 | 4 | 1 | 2 | 3 | 4 | 5 |
| Atomic Concentration Ratio A | — | 0% | .50% | .80% | 1% | 3% | 5% | 10% | 20% |
| Crack Generation Rate | 88% | 83% | 33% | 15% | 0% | 0% | 0% | 0% | 0% |
| Defective Plating | 0% | 0% | 0% | 0% | 0% | 0% | 0% | 3% | 15% |

TABLE 1-continued

|  | Comparative Example | | | | Example | | | | |
| --- | --- | --- | --- | --- | --- | --- | --- | --- | --- |
|  | 1 | 2 | 3 | 4 | 1 | 2 | 3 | 4 | 5 |
| NG Rate in Reliability Test | 30% | 26% | 8% | 4% | 0% | 0% | 0% | 0% | 0% |

As shown in Table 1, cracks were identified in eighty eight out of the hundred samples as conventional products according to Comparative Example 1, and thirty out of the hundred samples were determined to be NG in the reliability test. In addition, cracks were identified in eighty three out of the hundred samples according to Comparative Example 2, and twenty six out of the hundred samples were determined to be NG in the reliability test. Cracks were identified in thirty three out of the hundred samples according to Comparative Example 3, and eight out of the hundred samples were determined to be NG in the reliability test. Cracks were identified in fifteen out of the hundred samples according to Comparative Example 4, and four out of the hundred samples were determined to be NG in the reliability test. On the other hand, according to Examples 1 to 5 where the atomic concentration ratio A was about 1% or more, none of the hundred samples was found to be cracked or NG in the reliability test. Furthermore, according to Example 1 with the atomic concentration ratio A of about 1%, Example 2 with the atomic concentration ratio A of about 3%, and Example 3 with the atomic concentration ratio A of about 5%, none of the hundred samples was found to be defective in plating.

From the foregoing results, the advantageous effects achieved by preferred embodiments of the present invention have been successfully confirmed.

It is to be noted that the cracks were all, with an e-dimension end of the external electrode as a starting point, extended in the laminated bodies toward the chip side surfaces at an angle of about 45 degrees. In addition, when the products subjected to the organic layer process, without any crack identified, were examined closely by the SEM, slight delamination was identified between the external electrodes and the Ni plating.

In the descriptions of the preferred embodiments described above, the configurations of elements and features which can be combined may be combined with each other. The preferred embodiments disclosed herein should be considered by way of example in all respects, and non-limiting. The scope of the present invention is defined by the claims, but not by the foregoing descriptions, and intended to encompass all modifications within the spirit and scope equivalent to the claims.

Figure 4:
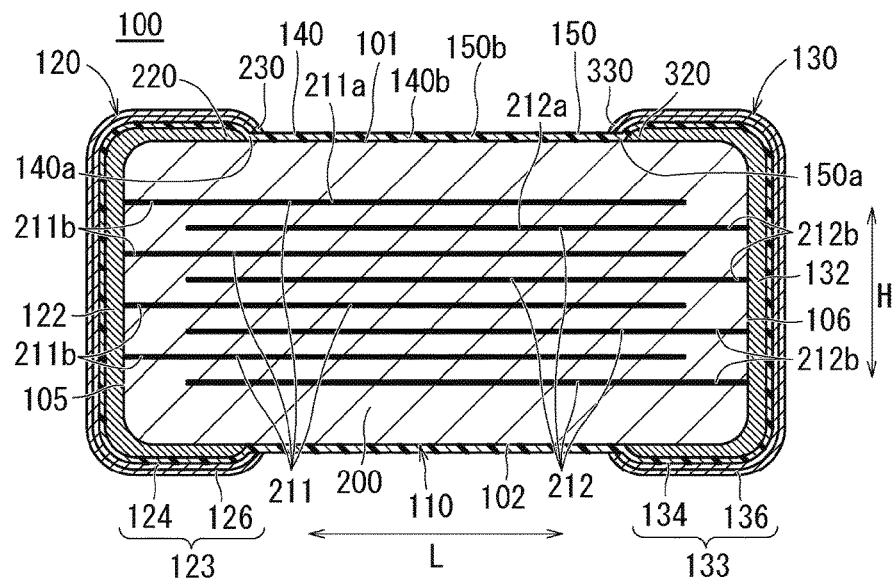
FIG. 4 is a cross-sectional view of a modified example of a multilayer ceramic electronic component according to another preferred embodiment of the present invention.

For example, in the case of the preferred embodiments described above, there is preferably a portion with no organic layer between the first external electrode 120 and the second external electrode 130 of the multilayer ceramic capacitor 100. However, as shown in FIG. 4, the organic layers may be disposed on the entire exposed surface of the laminated body 110 between the first external electrode 120 and the second external electrode 130, in such a way that the other end 140b of the first organic layer 140 extends to a central portion of the laminated body 110, whereas the other end 150b of the second organic layer 150 extends to the central portion of the laminated body 110, so as to provide a joint at the central portion.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a laminated body including a plurality of dielectric layers that are laminated and a plurality of internal electrodes that are laminated, and further including a first principal surface and a second principal surface opposed to each other in a laminating direction, a first side surface and a second side surface opposed to each other in a width direction perpendicular or substantially perpendicular to the laminating direction, and a first end surface and a second end surface opposed to each other in a length direction perpendicular or substantially perpendicular to the laminating direction and the width direction;
a first external electrode connected to the plurality of internal electrodes, and disposed on the first end surface, with an end extending onto the first principal surface, the second principal surface, the first side surface, and the second side surface;
a second external electrode connected to the plurality of internal electrodes, and disposed on the second end surface, with an end extending onto the first principal surface, the second principal surface, the first side surface, and the second side surface; wherein
the first external electrode includes a first base electrode layer including a conductive metal and a glass component, a first organic layer including an organic silicon compound, covering the first base electrode layer, and a first plating layer disposed on the first organic layer;
the second external electrode includes a second base electrode layer including a conductive metal and a glass component, a second organic layer including an organic silicon compound, covering the second base electrode layer, and a second plating layer disposed on the second organic layer;
the first organic layer covers from the first base electrode layer to a surface of the laminated body, and the second organic layer covers from the second base electrode layer to a surface of the laminated body;
a leading end of the first plating layer is in contact with the first organic layer, and a leading end of the second plating layer is in contact with the second organic layer;
a relational expression of A>B is satisfied by an atomic concentration ratio B of Si to Cu in the first organic layer disposed on the first base electrode layer located on the first end surface, an atomic concentration ratio A of Si to Cu in the first organic layer disposed on the first base electrode layer located on the first principal surface and the second principal surface, and an atomic concentration ratio A of Si to Cu in the first organic layer located directly on the first principal surface and the second principal surface; and
a relational expression of A>B is satisfied by an atomic concentration ratio B of Si to Cu in the second organic layer disposed on the second base electrode layer located on the second end surface, an atomic concentration ratio A of Si to Cu in the second organic layer disposed on the second base electrode layer located on the first principal surface and the second principal surface, and an atomic concentration ratio A of Si to Cu in the second organic layer located directly on the first principal surface and the second principal surface.

2. The multilayer ceramic electronic component according to claim 1, wherein
an adhesion strength between the laminated body and the first base electrode layer is higher than an adhesion strength between the first organic layer and the first plating layer; and
an adhesion strength between the laminated body and the second base electrode layer is higher than an adhesion strength between the second organic layer and the second plating layer.

3. The multilayer ceramic electronic component according to claim 1, wherein
an adhesion strength between the laminated body and the first organic layer is higher than an adhesion strength between the first organic layer and the first plating layer; and
an adhesion strength between the laminated body and the second organic layer is higher than an adhesion strength between the second organic layer and the second plating layer.

4. The multilayer ceramic electronic component according to claim 1, wherein the first organic layer and the second organic layer include an organic silicon compound that has a structure of multifunctional alkoxysilane $Si-(C_nH_{2n+1})_3$, and includes an N element.

5. The multilayer ceramic electronic component according to claim 1, wherein
an atomic concentration of Si to Cu is about 1% or more and about 5% or less between a Cu concentration and an Si concentration at a surface of the first organic layer; and
an atomic concentration of Si to Cu is about 1% or more and about 5% or less between a Cu concentration and an Si concentration at a surface of the second organic layer.

6. The multilayer ceramic electronic component according to 1, wherein the multilayer ceramic electronic component is a multilayer ceramic capacitor.

7. The multilayer ceramic electronic component according to claim 1, wherein
a portion of the first organic layer is in contact with the laminated body, and one end of the portion of the first organic layer in contact with the laminated body covers an end of the first base electrode layer; and
a portion of the second organic layer is in contact with the laminated body, and one end of the portion of the second organic layer in contact with the laminated body covers an end of the second base electrode layer.

8. The multilayer ceramic electronic component according to claim 7, wherein
the portion of the first organic layer in contact with the laminated body is disposed on the first principal surface, the second principal surface, the first side surface, and the second side surface so as to wrap around the laminated body; and
the portion of the second organic layer in contact with the laminated body is disposed on the first principal surface, the second principal surface, the first side surface, and the second side surface so as to wrap around the laminated body.

9. The multilayer ceramic electronic component according to claim 8, wherein the portions of the first organic layer and the second organic layer disposed on the first principal surface and the second principal surface of the laminated body have a thickness of about 5 nm or more and about 100 nm or less.

10. The multilayer ceramic electronic component according to claim 7, wherein
the portion of the first organic layer in contact with the laminated body has a dimension in the length direction of about 5 μm or more and about 100 μm or less; and
the portion of the second organic layer in contact with the laminated body has a dimension in the length direction of about 5 μm or more and about 100 μm or less.

11. The multilayer ceramic electronic component according to claim 7, wherein
the portion of the first organic layer in contact with the laminated body has a thickness greater than a thickness of a portion of the first organic layer covering the first base electrode layer; and
the portion of the second organic layer in contact with the laminated body has a thickness greater than a thickness of a portion of the second organic layer covering the first base electrode layer.

12. The multilayer ceramic electronic component according to claim 7, wherein the one end of the portion of the first organic layer that covers the end of the first base electrode layer and the one end of the portion of the second organic layer that covers the end of the second base electrode layer each have a thickness of about 5 nm or more and about 500 nm or less.

13. The multilayer ceramic electronic component according to claim 1, wherein the first and second organic layers cover all portions of the first and second principal surfaces and the first and second side surfaces of the laminated body.

14. The multilayer ceramic electronic component according to claim 1, wherein each of the first and second plating layers includes a plurality of layers.

15. The multilayer ceramic electronic component according to claim 14, wherein each of the first and second plating layers includes an Ni plating layer and an Sn plating layer.

16. The multilayer ceramic electronic component according to claim 14, wherein each of the plurality of layers of the first and second plating layers has a thickness of about 1 μm or more and about 15 μm or less.

17. The multilayer ceramic electronic component according to claim 1, wherein each of the first and second plating layers are made of at least one selected from Cu, Ni, Ag, Pd, Ag—Pd alloy, Au, and Sn.

* * * * *